US012631859B2

(12) United States Patent
Barilli et al.

(10) Patent No.: US 12,631,859 B2
(45) Date of Patent: May 19, 2026

(54) ILLUMINATION OPTICAL DEVICE COMPRISING A COLLIMATOR HAVING LOW INTRINSIC NOISE

(71) Applicant: LEONARDO S.P.A., Rome (IT)

(72) Inventors: Marco Barilli, Pomezia (IT); Michele Dami, Pomezia (IT); Fulvio Grifoni, Pomezia (IT); Carlo Pompei, Pomezia (IT)

(73) Assignee: LEONARDO S.P.A., Rome (IT)

( * ) Notice: Subject to any disclaimer, the term of this patent is extended or adjusted under 35 U.S.C. 154(b) by 304 days.

(21) Appl. No.: 18/578,904

(22) PCT Filed: Jul. 22, 2022

(86) PCT No.: PCT/IB2022/056783
§ 371 (c)(1),
(2) Date: Jan. 12, 2024

(87) PCT Pub. No.: WO2023/002444
PCT Pub. Date: Jan. 26, 2023

(65) Prior Publication Data
US 2024/0329374 A1 Oct. 3, 2024

(30) Foreign Application Priority Data

Jul. 23, 2021 (EP) ..................................... 21425036
Jan. 18, 2022 (IT) ......................... 102022000000722

(51) Int. Cl.
| | |
|---|---|
| *G02B 17/06* | (2006.01) |
| *G02B 5/00* | (2006.01) |
| *G02B 19/00* | (2006.01) |

(52) U.S. Cl.
CPC ......... *G02B 17/0663* (2013.01); *G02B 5/003* (2013.01); *G02B 19/0019* (2013.01); *G02B 19/0047* (2013.01)

(58) Field of Classification Search
None
See application file for complete search history.

(56) References Cited

U.S. PATENT DOCUMENTS

| | | | |
|---|---|---|---|
| 5,142,417 | A | 8/1992 | Brunn |
| 2009/0091753 | A1 | 4/2009 | Beardsley et al. |

(Continued)

FOREIGN PATENT DOCUMENTS

| | | |
|---|---|---|
| CN | 108760047 A | 11/2018 |
| JP | 2005086148 A | 3/2005 |
| JP | 2019070625 A | 5/2019 |

OTHER PUBLICATIONS

International Preliminary Report on Patentability for International Application No. PCT/IB2022/056783 mailed Jun. 6, 2023.

(Continued)

*Primary Examiner* — Edmond C Lau
(74) *Attorney, Agent, or Firm* — Ballard Spahr LLP

(57) ABSTRACT

The illumination optical device comprises a collimator, a light source, and an aperture. The collimator comprises a primary mirror, a secondary mirror, a tertiary mirror and a quaternary mirror mutually tilted so as to form a collimator optical path extending between the light source and the aperture and formed, in succession, by the light source, the quaternary mirror, the tertiary mirror, the secondary mirror, the primary mirror and the aperture. The light source is configured to emit light rays, along respective directions, which form a main beam propagating along directions intercepting the quaternary mirror so as to follow the collimator optical path; and a secondary beam propagating along directions not intercepting the quaternary mirror. The illumination optical device is characterised in that the collimator comprises a shielding structure configured to prevent illumination of the aperture by the secondary light beam.

9 Claims, 10 Drawing Sheets

(56)            References Cited

U.S. PATENT DOCUMENTS

2014/0254003 A1\*   9/2014   Katashiba .......... G02B 17/0647
                                        359/366
2020/0284654 A1    9/2020   Sabry et al.

OTHER PUBLICATIONS

International Search Report and Written Opinion from International Application No. PCT/IB2022/056783 mailed Nov. 7, 2022.

Reply to Written Opinion for International Application No. PCT/IB2022/056783 filed May 22, 2023.

Barilli, et al., "An unobscured four spherical mirrors based collimator as a tradeoff solution for the Optical Ground Support Equipment (OGSE) of the High Resolution Camera (HRIC) of Simbio-Sys", Proc. of SPIE, vol. 8846, Sep. 24, 2012, pp. 84463Z-1-84463Z-5.

Rolt, et al., "A Four Mirror Anastigmat Collimator Design for Optical Payload Calibration", Proc. of SPIE, vol. 9904, Jul. 29, 2016, pp. 99044U-1-99044U-11.

\* cited by examiner

ILLUMINATION OPTICAL DEVICE COMPRISING A COLLIMATOR HAVING LOW INTRINSIC NOISE

CROSS-REFERENCE TO RELATED APPLICATIONS

This Patent Application is a U.S. national stage of PCT/IB2022/056783 filed on Jul. 22, 2022, which claims priority to European Patent Application No. 21425036.7 filed on Jul. 23, 2021 and to Italian patent application No. 102022000000722 filed on Jan. 18, 2022, the entire disclosure of each of which is incorporated herein by reference.

TECHNICAL FIELD OF THE INVENTION

The present invention relates to an illumination optical device comprising a collimator. In particular, the invention refers to an illumination device or projector that can be used to obtain an Optical Ground Support Equipment (OGSE) capable of testing, calibrating and/or verifying the optical characteristics of an electro-optical device. The present invention finds advantageous but not exclusive application in the aerospace field.

BACKGROUND OF THE INVENTION

As is known, an electro-optical device may be subjected to one or more test and verification steps before the actual use on field of the electro-optical device itself, especially in applications where high reliability of the electro-optical device is required.

For example, in the aerospace field, Optical Ground Support Equipment (OGSE) is known to be used to verify the optical performance of various electro-optical devices during specific Assembly Integration and Test (AIT) or Assembly and Integration Test (AIT) activities.

One of the key parameters that is analysed during the testing activities of an electro-optical device, later identified as a Unity Under Test (UUT), is the stray light generated by the unit under test when subjected to an optical stimulus.

The stray light is generally defined as a light noise component that is generated by an optical device, e.g. formed by light that is propagated following an optical path different from a desired optical path.

Analysing the stray light generated by a unit under test thus allows to verify the optical performance of the unit under test.

FIG. 1 shows a system 1 comprising a known illumination device or illuminator 3 and a unit under test 5 having an optical architecture 5A and an optical detector 5B.

The illuminator 3 comprises one or more light sources and a collimator (not shown here) and is configured to generate a light beam 7 that propagates towards the unit under test 5.

The light beam 7 comprises a collimated portion 9, which constitutes a desired collimated optical stimulus for the unit under test 5, and a stray portion 10, which constitutes a non-collimated noise light radiation.

The stray portion 10 constitutes a signature of the illuminator 3 and is generated by imperfections inside the illuminator 3 itself, in particular of the respective collimator.

The optical architecture 5A receives the optical beam 7 and generates a device light beam 13, focused on the detector 5B.

The optical architecture 5A receives and propagates both the collimated component 9 and the stray component 10 of the optical beam 7.

Consequently, the device light beam 13 comprises both a primary portion 14 and an illuminator stray portion 15.

The primary portion 14 forms the desired optical signal output by the optical architecture 5A, i.e. the optical signal generated starting from the collimated portion 10 of the optical beam 7. The illuminator stray portion 15 forms a noise signal generated starting from the stray portion 10 of the optical beam 7, and thus dependent on the optical properties of the illuminator 3.

In addition, the optical architecture 5A may generate a device stray light component 16, starting from the collimated portion 9 of the optical beam 7, due to imperfections of the optical elements, e.g. mirrors, lenses, etc. that form the optical architecture 5A. Consequently, the device optical beam 13 also comprises a device stray portion 17, generated starting from the device stray light component 16.

In practice, when the optical detector 5B receives the device optical beam 13, it detects the primary portion 14 thereof, the illuminator stray portion 15 and the device stray portion 17.

The presence of the illuminator stray portion 15 in the device optical beam 13 makes it difficult, if not impossible, to isolate the device stray portion 17, or to isolate the noise contribution introduced by the unit under test 5.

Therefore, the fact that the illuminator 3 generates a stray portion of light does not allow to isolate the noise contribution introduced by the unit under test 5, i.e. it does not allow to reliably verify the performance of the optical unit under test 5, during the testing steps.

OBJECT AND SUMMARY OF THE INVENTION

Aim of the present invention is to overcome the disadvantages of the prior art.

According to the present invention there is thus provided an illumination optical device comprising a collimator, as defined in the appended claims.

BRIEF DESCRIPTION OF THE DRAWINGS

To better understand the present invention preferred embodiments thereof will be now described, for merely exemplary and non-limiting purposes, with reference to the appended drawings, wherein.

DETAILED DESCRIPTION OF PREFERRED EMBODIMENTS OF THE INVENTION

The following description is provided to enable a person skilled in the art to use and realize the invention. Various modifications to the embodiments will be apparent to those skilled in the art, without departing from the scope of protection of the claimed invention. Consequently, the present invention is not intended to be limited to the embodiments shown, but the widest protection scope is to be accorded consistently with the principles and features described below and defined in the appended claims.

Unless otherwise specified, all scientific and technical terms used below have the same meaning as commonly understood by a person skilled in the ordinary art. In the event of any conflict, this description, including the definitions provided, shall be binding. In addition, the examples are illustrative only and are not intended to be limiting.

The terminology used below is intended to describe particular embodiments and is not to be construed as limiting the purpose of the present disclosure.

Figure 2:
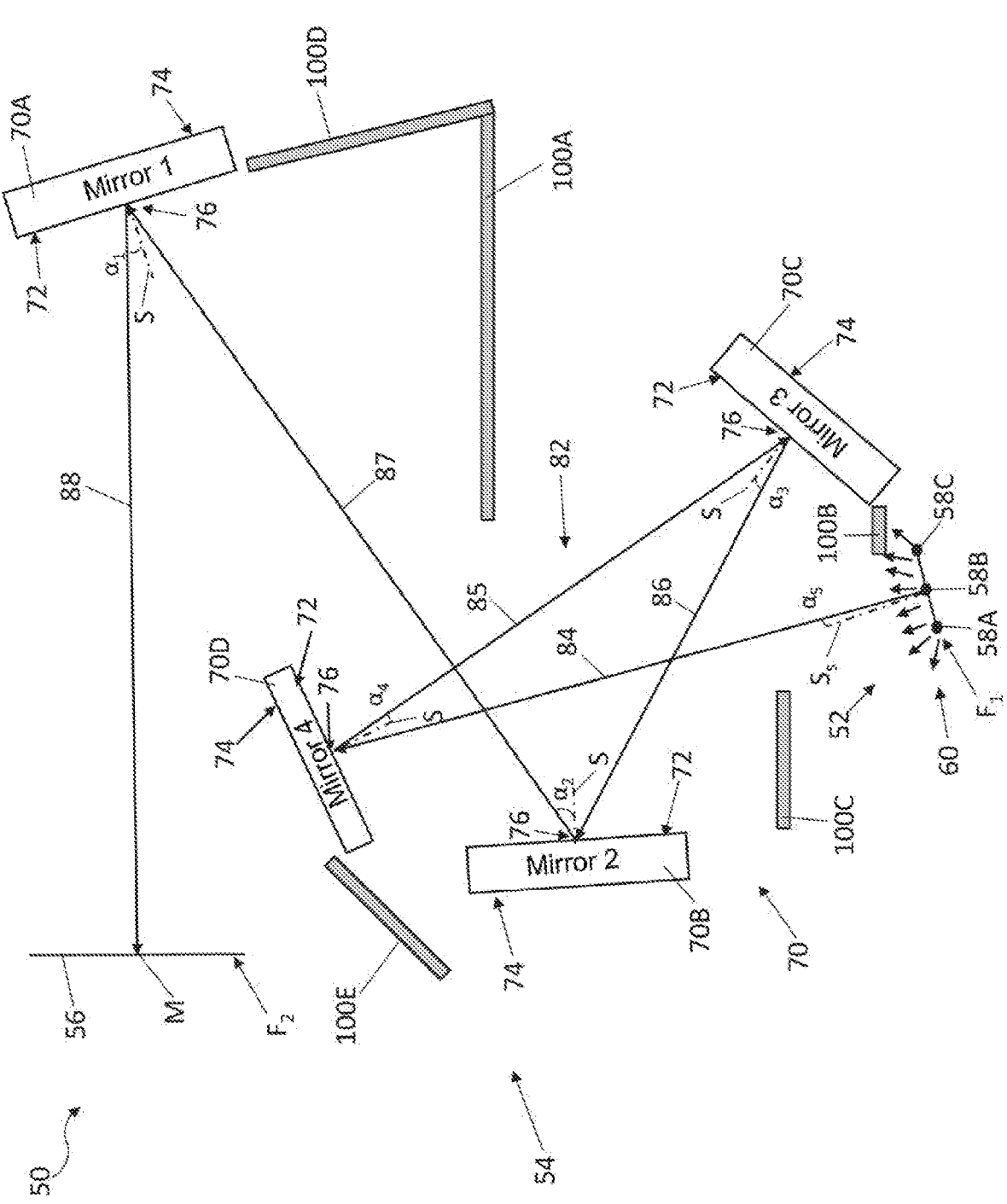
FIGS. 2-4 show schematic top plan views of an illuminator comprising a collimator, according to an embodiment of the present invention.
Figure 3:
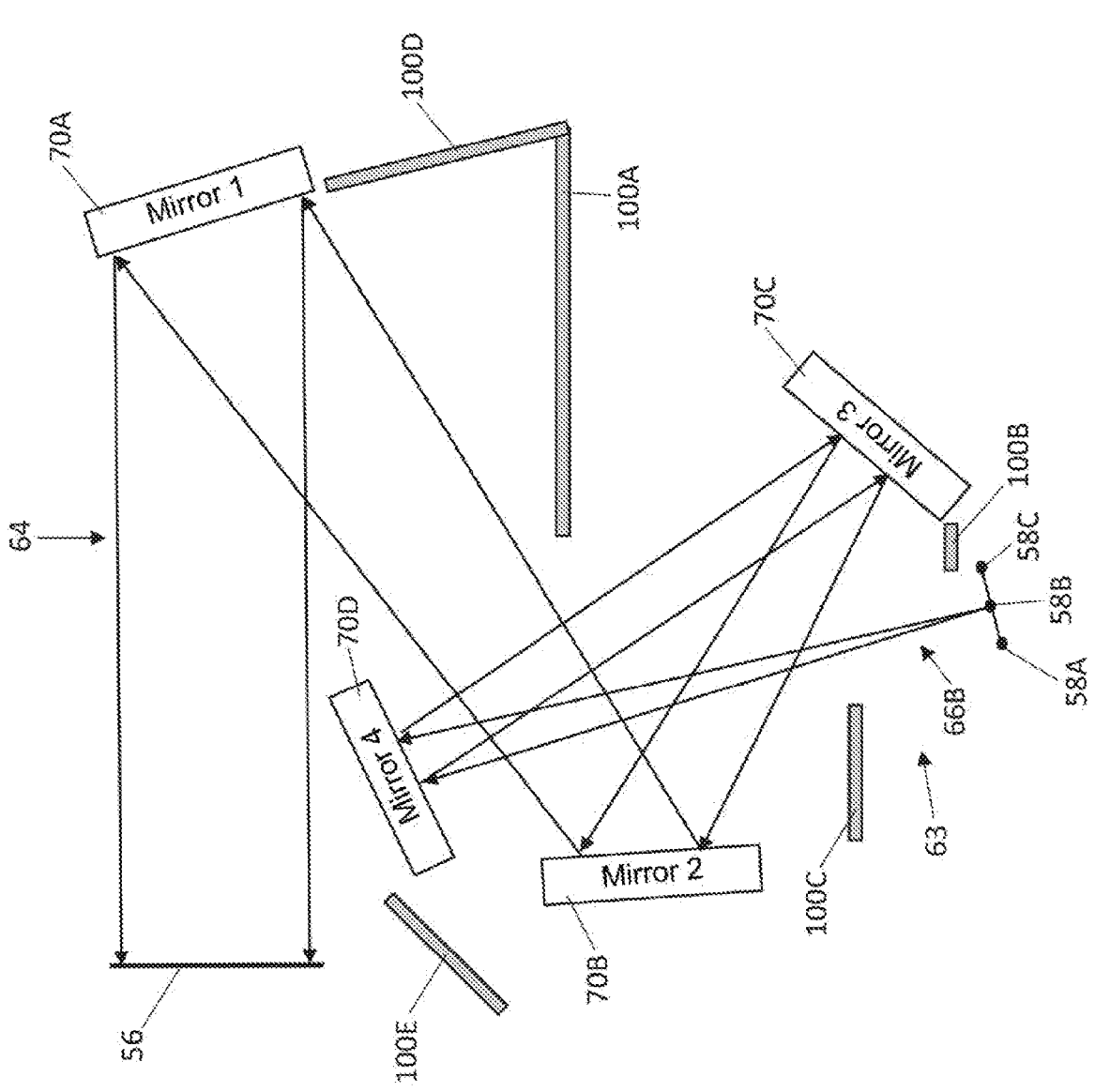
Figure 4:
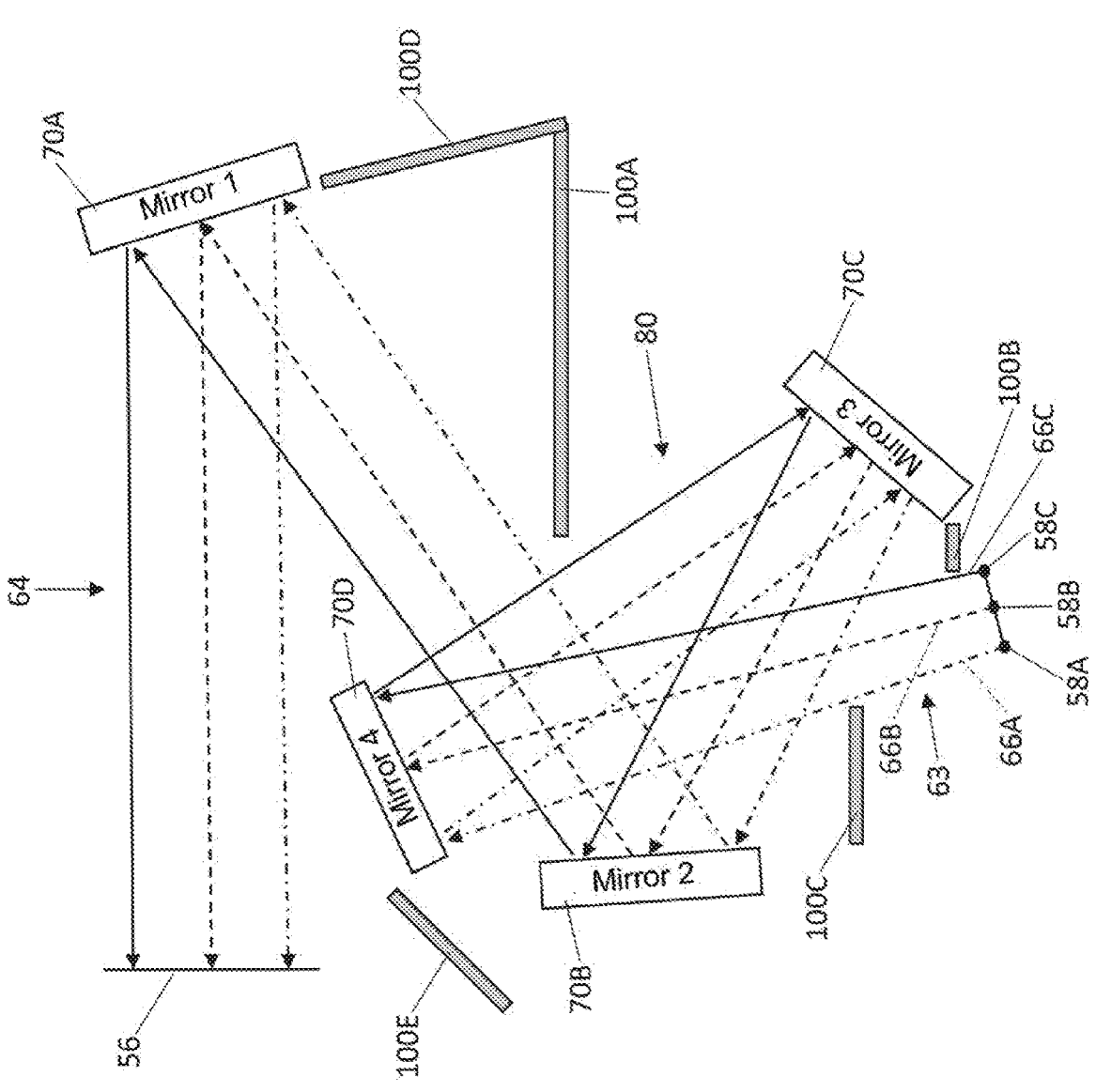

FIGS. 2-4 show an illumination device, hereinafter referred to as an illuminator 50, comprising an extended light source 52, a collimator 54 having an input focal plane $F_1$ and an output focal plane $F_2$ and defining a collimator optical path 80, and an aperture or pupil 56, mutually optically coupled.

The extended light source 52 is of a known type, e.g. an LED source or any other type of known source, of monochromatic or polychromatic type, configured to generate a light radiation 60, schematically represented by arrows in FIG. 2, propagating from the extended light source 52. For example, the light radiation 60 comprises electromagnetic radiation in the frequency range between infrared and ultraviolet.

The light radiation 60 is formed by a primary light beam 63 (FIG. 4), propagating along directions intercepting the quaternary mirror 70D so as to follow the collimator optical path 80, and a secondary light beam 65 (FIGS. 6-9), propagating along directions not intercepting the quaternary mirror 70D.

In detail, the extended light source 52 is arranged in the input focal plane $F_1$ of the collimator 54 and the aperture 56 is arranged in the output focal plane $F_2$, so that the primary light beam 63 is collimated, by the collimator 54, in an output beam 64 having a flat wavefront on the aperture 56, as schematically shown in FIG. 4.

The extended light source 52 is represented in FIGS. 2-4 by three mutually distinct point sources and hereinafter referred to as first point source 58A, second point source 58B and third point source 58C.

The point sources 58A-58C each emit a respective optical beam 66A-66C having a spherical wavefront, the propagation of which along the collimator optical path 80 is schematically shown in FIG. 4. FIG. 3 shows in detail the propagation of the optical beam 66B of the second point source 58B along the collimator optical path 80.

The three point sources 58A-58C may be sources equal to or different from one another, for example each having a respective frequency or they may each represent a respective pixel of the extended light source 52.

In detail, the first and third point source 58A, 58C are arranged at two end points of the extended light source 52. The second point source 58B is arranged at a midpoint of the extended light source 52.

The collimator 54 is a collimator of the Schiefspiegler type, i.e. comprising a plurality of mirrors 70 arranged off-axis and mutually tilted so as to form an unobstructed optical path.

In detail, as described in U.S. Pat. No. 5,142,417 A, the collimator 54 comprises four mirrors: a primary mirror 70A, a secondary mirror 70B, a tertiary mirror 70C, and a quaternary mirror 70D, each having a respective reflective surface 72 and a respective support surface 74.

The mirrors 70A-70D are preferably spherical mirrors, each concave or convex.

The mirrors 70A-70D each have a respective focal ratio, which may be chosen depending on the specific design of the collimator 54.

Figure 1:
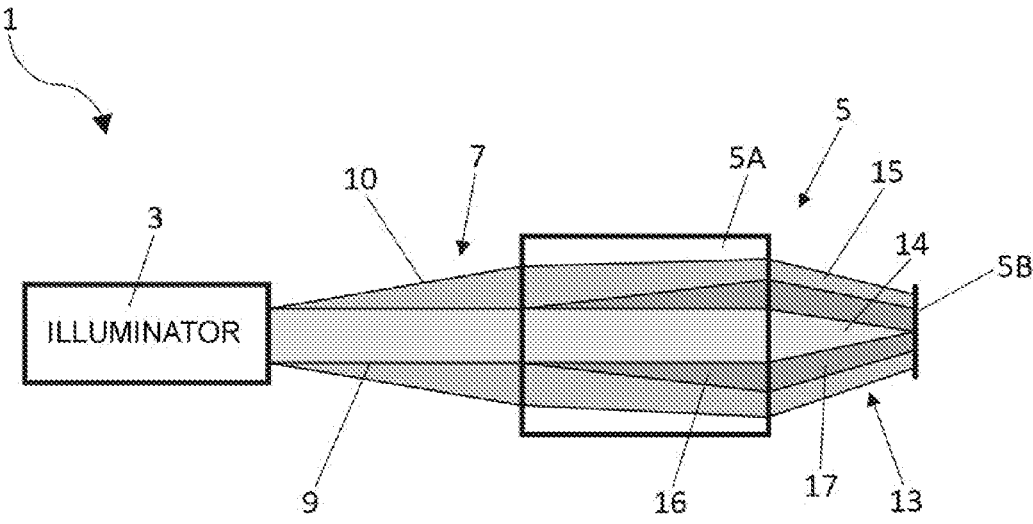
FIG. 1 shows a block diagram of a test system of an electro-optical device comprising a known illuminator.
Figure 5:
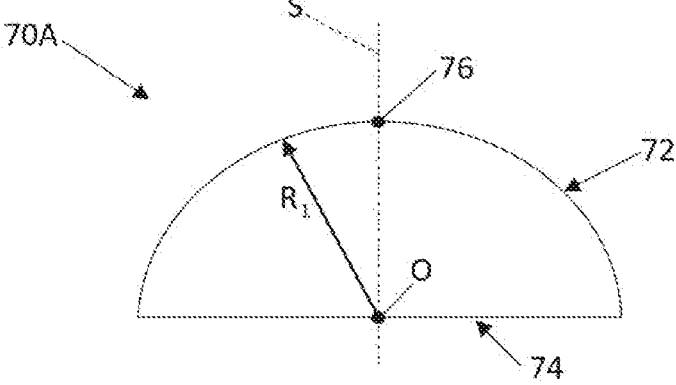
FIG. 5 shows a schematic cross-section of a mirror of the collimator of FIG. 2.

FIG. 5 shows by way of example a cross-section of the primary mirror 70A, here of concave type, whose reflective surface 72 has a radius of curvature $R_1$ with respect to a centre O defined on the support surface 74.

The primary mirror 70A has a vertex 76, on the reflective surface 72, formed by the intersection between the reflective surface 72 and a mirror axis S passing through the centre O and perpendicular to the support surface 74.

Similar to what has been described for the primary mirror 70A, the secondary mirror 70B, the tertiary mirror 70C and the quaternary mirror 70D also have a respective radius of curvature $R_2$, $R_3$, $R_4$ and a respective vertex 76 defined by a respective mirror axis S.

Again with reference to FIG. 2, the collimator optical path 80 of the collimator 54 comprises, in succession, the extended light source 52 (here arranged in the input focal plane $F_1$), the quaternary mirror 70D, the tertiary mirror 70C, the secondary mirror 70B, the primary mirror 70A and the aperture 56 (here arranged in the output focal plane $F_2$).

In detail, the collimator optical path 80 has a collimator optical axis 82, indicated by a succession of arrows in FIG. 2, comprising a first stretch 84, a second stretch 85, a third stretch 86, a fourth stretch 87 and a fifth stretch 88.

The first stretch 84 of the collimator optical axis 82 extends between the second point source 58B and the vertex 76 of the quaternary mirror 70D. The second stretch 85 of the collimator optical axis 82 extends between the vertex 76 of the quaternary mirror 70D and the vertex 76 of the tertiary mirror 70C. The third stretch 86 of the collimator optical axis 82 extends between the vertex 76 of the tertiary mirror 70C and the vertex 76 of the secondary mirror 70B. The fourth stretch 87 of the collimator optical axis 82 extends between the vertex 76 of the secondary mirror 70B and the vertex 76 of the primary mirror 70A. The fifth stretch 88 of the collimator optical axis 82 extends between the vertex 76 of the primary mirror 70A and a point of the aperture 56, in particular a midpoint M of the aperture 56.

In practice, with reference to the collimator optical axis 82, the first stretch 84 defines a distance $e_4$ between the extended light source 52 and the quaternary mirror 70D, the second stretch 85 defines a distance $e_3$ between the quaternary mirror 70D and the tertiary mirror 70C, the third stretch 86 defines a distance $e_2$ between the tertiary mirror 70C and the secondary mirror 70B, and the fourth stretch 87 defines a distance $e_1$ between the secondary mirror 70B and the primary mirror 70A.

The mirrors 70A-70D are each arranged rotated with respect to the collimator optical axis 82 by a respective tilt angle.

In detail, the mirror axis S of the primary mirror 70A forms a tilt angle $\alpha_1$ with respect to the fifth stretch 88 of the collimator optical axis 82. The mirror axis S of the secondary mirror 70B forms a tilt angle $\alpha_2$ with respect to the fourth stretch 87 of the collimator optical axis 82. The mirror axis S of the tertiary mirror 70C forms a tilt angle $\alpha_3$ with respect to the third stretch 86 of the collimator optical axis 82. The mirror axis S of the quaternary mirror 70D forms a tilt angle $\alpha_4$ with respect to the second stretch 85 of the collimator optical axis 82.

The mirror axis S of the quaternary mirror 70D and the mirror axis S of the primary mirror 70A form between them an angle comprised between 89= and 91°, in particular approximately of 90°. In this way, in use, it is possible to avoid that the main light beam 63, after impinging on the quaternary mirror 70D, is reflected towards the primary mirror 70A.

Further, the first stretch 84 of the collimator optical axis 82 forms a tilt angle $\alpha_S$ with a source axis $S_S$ perpendicular to the focal plane F of the collimator 54 and passing through the second point source 58B.

The distance between the mirrors 70A-70D, the tilt angle and the radius of curvature of the mirrors 70A-70D may be determined, at the design stage, as a function of a desired effective focal length of the collimator 54 and/or of a frequency range of the light radiation 60 generated by the extended light source 52.

Additionally or alternatively, the distance between the mirrors 70A-70D, the tilt angle and the radius of curvature of the mirrors 70A-70D may be chosen, at the design stage, so as to eliminate, in the first approximation, the aberrations of the collimator 54.

For example, the mirrors 70A-70D may be designed to reduce the aberrations of coma C and astigmatism A, as described in U.S. Pat. No. 5,142,417 A.

For example, the tilt angle $\alpha_3$ of the tertiary mirror 70C is lower than 25°.

For example, the distance $e_1$ between the primary mirror 70A and the secondary mirror 70B is comprised between a factor 0.4 and 0.6 of the focal length of the primary mirror 70A.

For example, the primary mirror 70A may be a concave spherical mirror and the secondary mirror 70B a convex spherical mirror.

For example, the quaternary mirror 70D may be a flat mirror, i.e. mathematically representable as a spherical mirror having infinite radius of curvature $R_4$.

Figure 12:
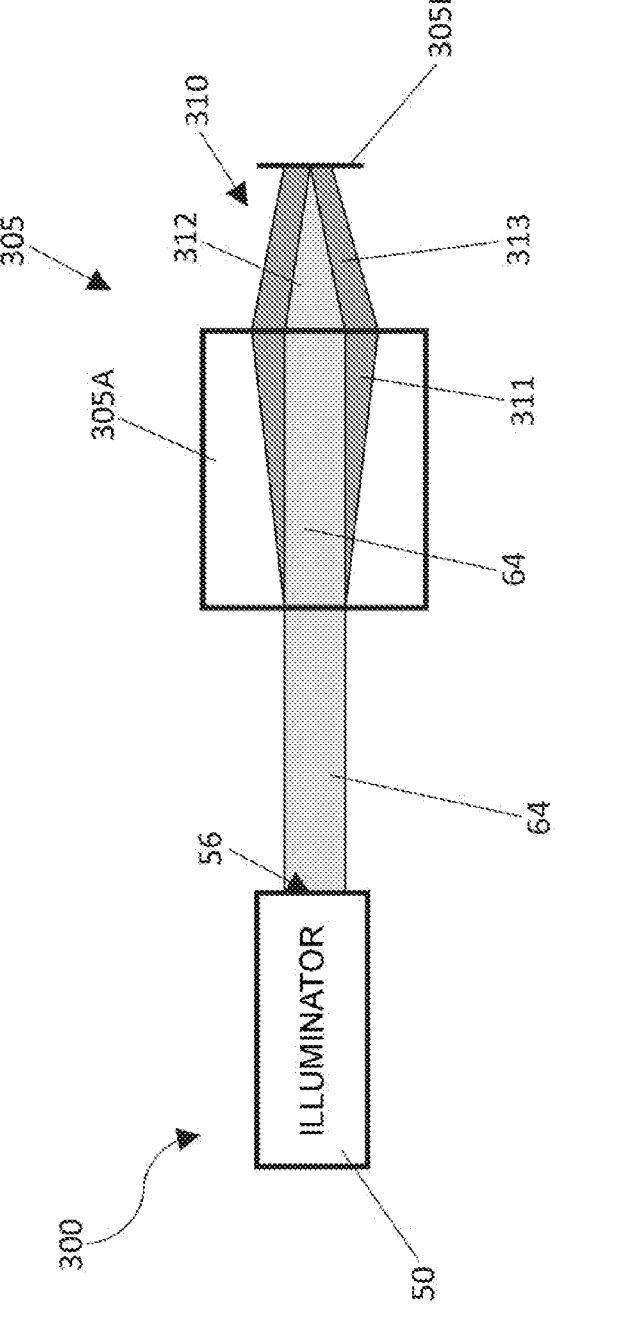
FIG. 12 shows a block diagram of a test system of an electro-optical device comprising an illuminator according to the present invention.

In addition, the specific three-dimensional arrangement of the mirrors 70A-70D may be chosen at the design stage depending on the specific application of the collimator 54. For example, as shown in the embodiment of FIG. 12 and described below, the mirrors 70A-70D may be mounted on a single optical working plane, so that the collimator optical axis 82 lies on a single plane.

However, the mirrors 70A-70D may have a different three-dimensional arrangement.

The collimator 54 further comprises a plurality of baffles 100A-100E, hereinafter individually referred to as first baffle 100A, second baffle 100B, third baffle 100C, fourth baffle 100D, and fifth baffle 100E, each configured to prevent a reflection of an incident light beam.

The baffles 100A-100E may each be of an opaque material, e.g., a thin metal plate, configured to absorb an incident light radiation.

In this embodiment, the first and the fourth baffle 100A, 100D are formed as one piece; the second, the third, and the fifth baffle 100B, 100C, 100E are distinct from each other. However, the baffles 100A-100E may form portions of a single absorbent body, as shown for example in FIG. 12.

Figure 6:
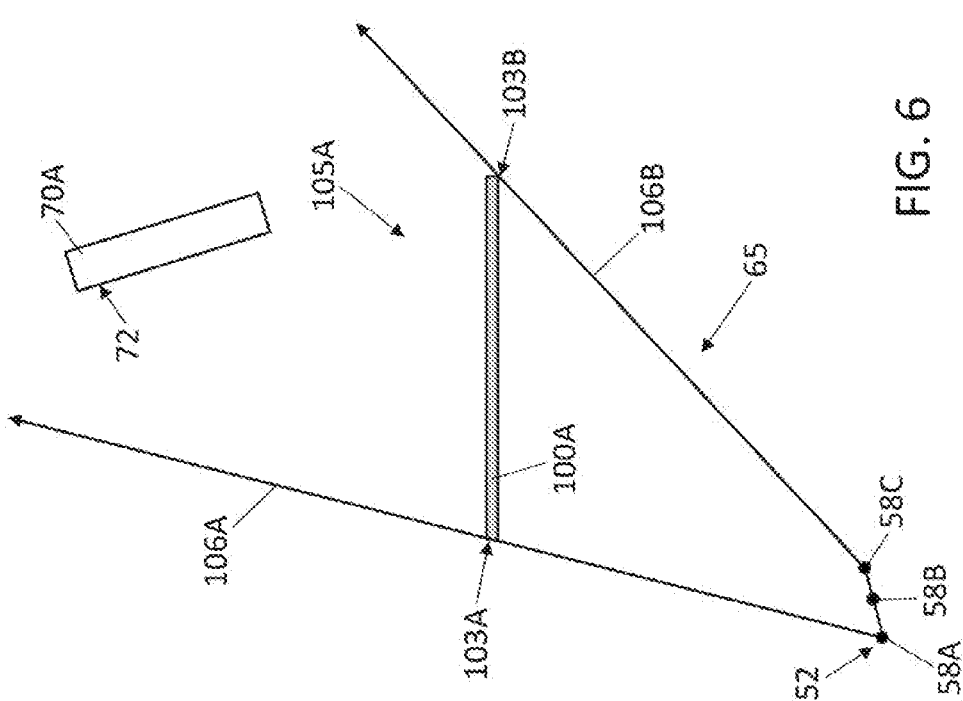

With reference to FIG. 6, the first baffle 100A has a first end 103A and a second end 103B and is arranged between the extended light source 52 and the primary mirror 70A, so as to form a first shadow region 105A of the secondary light beam 65 of the extended light source 52.

In the top view of FIG. 6, the first shadow region 105A is delimited by a first boundary ray 106A and a second boundary ray 106B, and is an umbra region of the extended light source 52.

The first boundary ray 106A belongs to the secondary light beam 65 and is a ray generated by the first point source 58A and passing contiguous to the first end 103A of the first baffle 100A. The second boundary ray 106B belongs to the secondary light beam 65 and is a ray generated by the third point source 58C and passing contiguous to the second end 103B of the first baffle 100A.

In practice, each ray of the secondary light beam 65 propagating between the first and the second boundary ray 106A, 106B impinges on the first baffle 100A and is absorbed by it.

The primary mirror 70A, in particular the respective reflective surface 72, is arranged in the first shadow region 105A.

Consequently, in use, the first baffle 100A ensures that no portion of the secondary light beam 65 of the extended light source 52 directly impinges on the reflective surface 72 of the primary mirror 70A.

Figure 7:
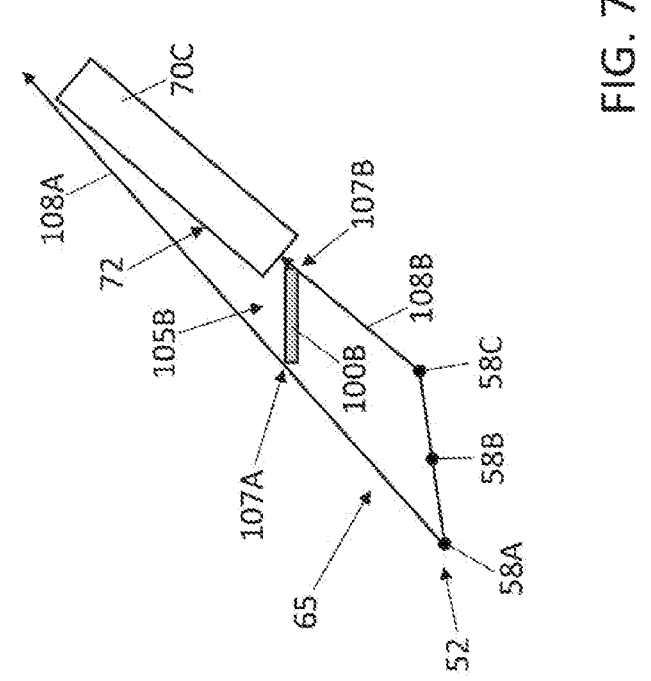
FIGS. 6-9 show top plan views of portions of the collimator of FIG. 2, in use.

With reference to the top view in FIG. 7, the second baffle 100B extends between a first end 107A and a second end 107B and is arranged between the extended light source 52 and the tertiary mirror 70C, so as to form a second shadow region 105B of the secondary light beam 65 of the extended light source 52.

The second shadow region 105B is delimited by a first boundary ray 108A and a second boundary ray 108B, and is an umbra region of the extended light source 52.

The first boundary ray 108A belongs to the secondary light beam 65 and is a ray generated by the first point source 58A and passing contiguous to the first end 107A of the second baffle 100B. The second boundary ray 108B belongs to the secondary light beam 65 and is a ray generated by the third point source 58C and passing contiguous to the second end 107B of the second baffle 100B.

In practice, each ray of the secondary light beam 65 propagating between the first and the second boundary ray 107A, 107B impinges on the second baffle 100B and is absorbed by it.

The tertiary mirror 70C, in particular the respective reflective surface 72, is arranged in the second shadow region 105B.

Consequently, in use, the second baffle 100B ensures that no portion of the secondary light beam 65 directly impinges on the reflective surface 72 of the tertiary mirror 70C.

Figure 8:
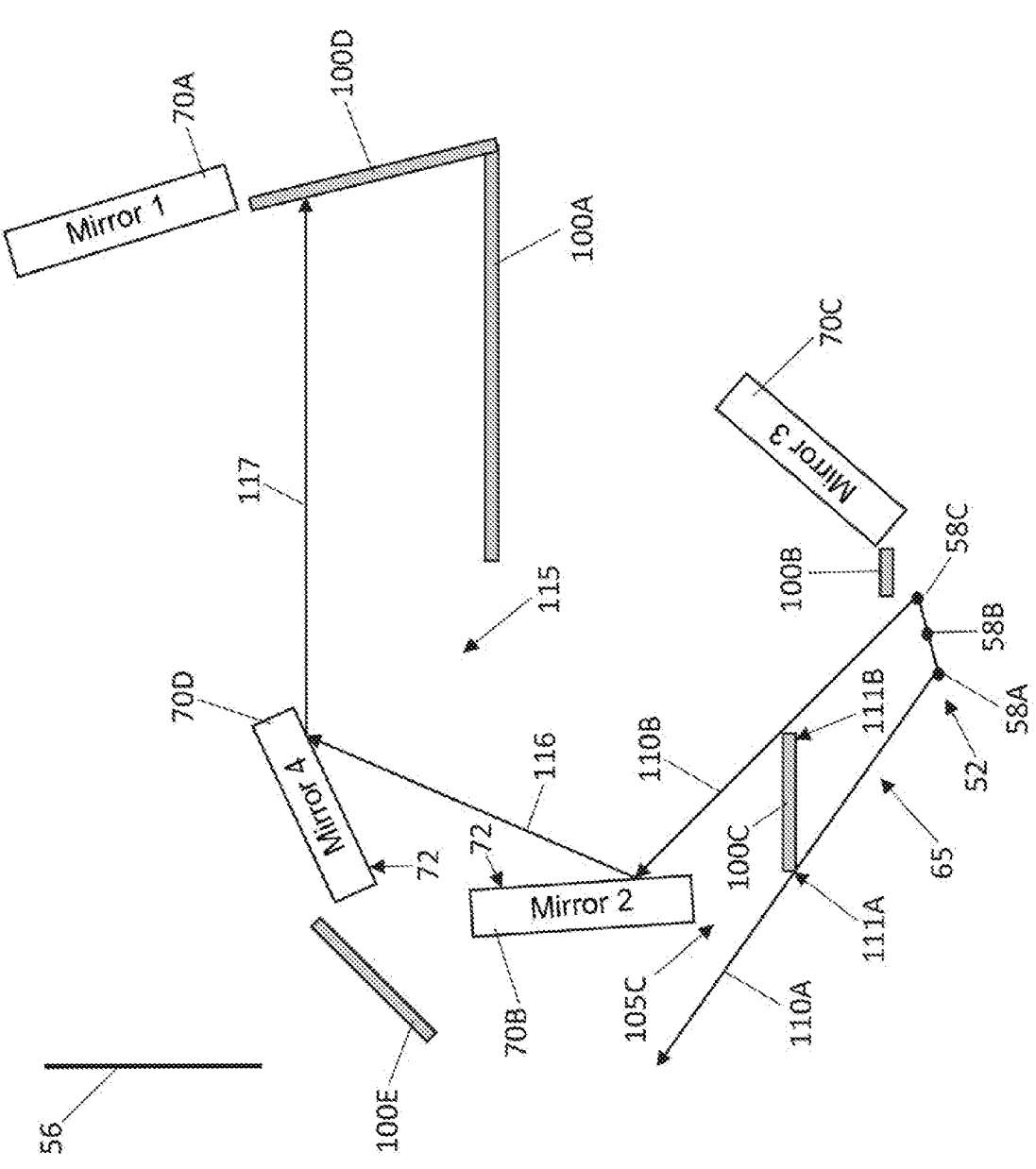

With reference to the top view of FIG. 8, the third baffle 100C extends between a first end 111A and a second end 111B and is arranged between the extended light source 52 and the secondary mirror 70B, so as to form a third shadow region 105C of the secondary light beam 65 of the extended light source 52.

The third shadow region 105C is delimited by a first boundary ray 110A and a second boundary ray 110B, and is an umbra region of the extended light source 52.

The first boundary ray 110A belongs to the secondary light beam 65 and is a ray generated by the first point source 58A and passing contiguous to the first end 111A of the third baffle 100C. The second boundary ray 110B belongs to the secondary light beam 65 and is a ray generated by the third point source 58C and passing contiguous to the second end 111B of the third baffle 100C.

In practice, each ray of the secondary light beam 65 propagating between the first and the second boundary ray 110A, 110B impinges on the third baffle 100C and is absorbed by it.

The secondary mirror 70B, in particular the respective reflective surface 72, is partially arranged in the third shadow region 105C.

In detail, the second boundary ray 110B of the third shadow region 105C impinges, in use, on the reflective surface 72 of the secondary mirror 70B.

The secondary mirror 70B and the quaternary mirror 70D, in particular the respective mirror axes, are mutually tilted of an angle comprised between 89° and 91°, in particular approximately of 90°.

The secondary mirror 72, the quaternary mirror 70D, and the fourth baffle 100D form a trap optical path 115.

The secondary mirror 70B reflects the second boundary ray 110B and forms a first reflected ray 116 incident on the reflective surface 72 of the quaternary mirror 70D. The quaternary mirror 70D reflects the first reflected ray 116 and forms a second reflected ray 117 incident on the fourth baffle 100D.

In practice, the secondary mirror 70B is partially shaded with respect to the extended light source 52, so that part of the secondary light beam 65 incident directly on the reflective surface 72 of the secondary mirror 70B follows the trap optical path 115 and is then absorbed by the fourth baffle 100D.

Figure 9:
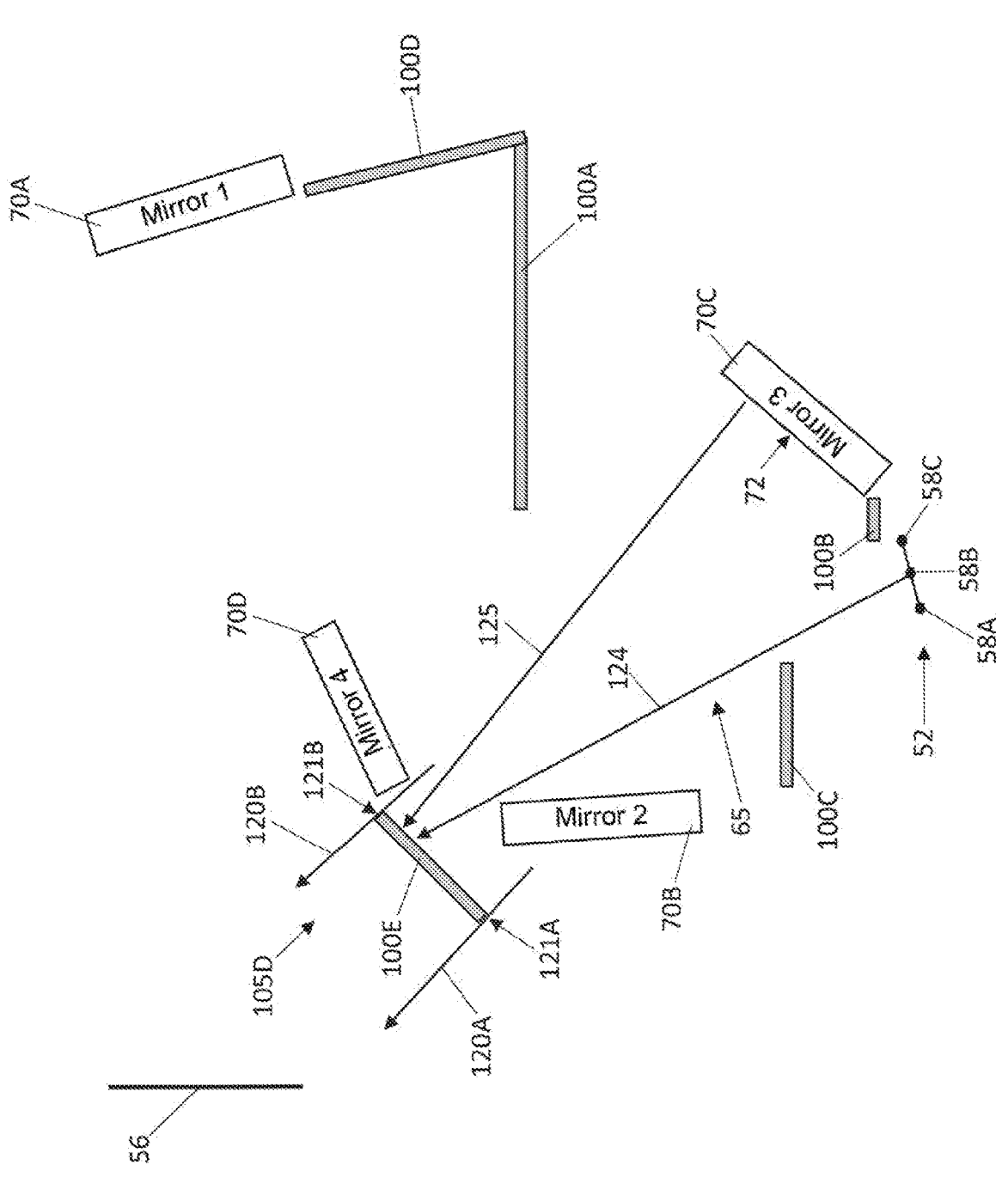

With reference to the top view of FIG. 9, the fifth baffle 100E extends between a first end 121A and a second end 121B and is arranged between the secondary mirror 70B and the quaternary mirror 70D.

The fifth baffle 100E forms a fourth shadow region 105D both with respect to the extended light source 52 and with respect to rays reflected by the tertiary mirror 70C that are external to the collimator optical path 80, i.e. with respect to rays reflected by the tertiary mirror 70C that are not directed towards the secondary mirror 70B.

In detail, the fourth shadow region 105D is delimited by a first boundary ray 120A passing contiguous to the first end 121A of the fifth baffle 100E and by a second boundary ray 120B passing contiguous to the second end 121B of the fifth baffle 100E, and is an umbra region of the extended light source 52 and of the tertiary mirror 70C.

The aperture 56 is arranged in the fourth shadow region 105D.

In practice, each light ray, identified by way of example by an arrow 124 in FIG. 9, of the secondary light beam 65 that is generated by the extended light source 52, passes between the quaternary mirror 70D and the secondary mirror 70B, and is directed towards the aperture 56, impinges on the fifth baffle 100E. Similarly, each light ray, identified by way of example by an arrow 125 in FIG. 9, which is reflected by the tertiary mirror 70C, passes between the quaternary mirror 70D and the secondary mirror 70B, and is directed toward the aperture 56 impinges on the fifth baffle 100E.

In practice, the baffles 100A-100E and the mutual arrangement of the quaternary mirror 70D and of the primary mirror 70A ensure that only the light rays generated by the extended light source 52 and following the collimator optical path 80 (i.e., the primary light beam 63 of the light radiation 60 of FIG. 4) reach the aperture 56. In practice, the collimator 80 has low intrinsic noise.

In other words, the stray light, that is, the light rays that do not follow the collimator optical path 80, generated inside the illuminator 50, does not reach the aperture 56.

Consequently, the illuminator 50 outputs, through the pupil 56, only the collimated output beam 64, which followed the collimator optical path 80.

The illuminator 50 therefore has a low signature. In other words, the illuminator 50 has a low intrinsic noise.

Figure 10:
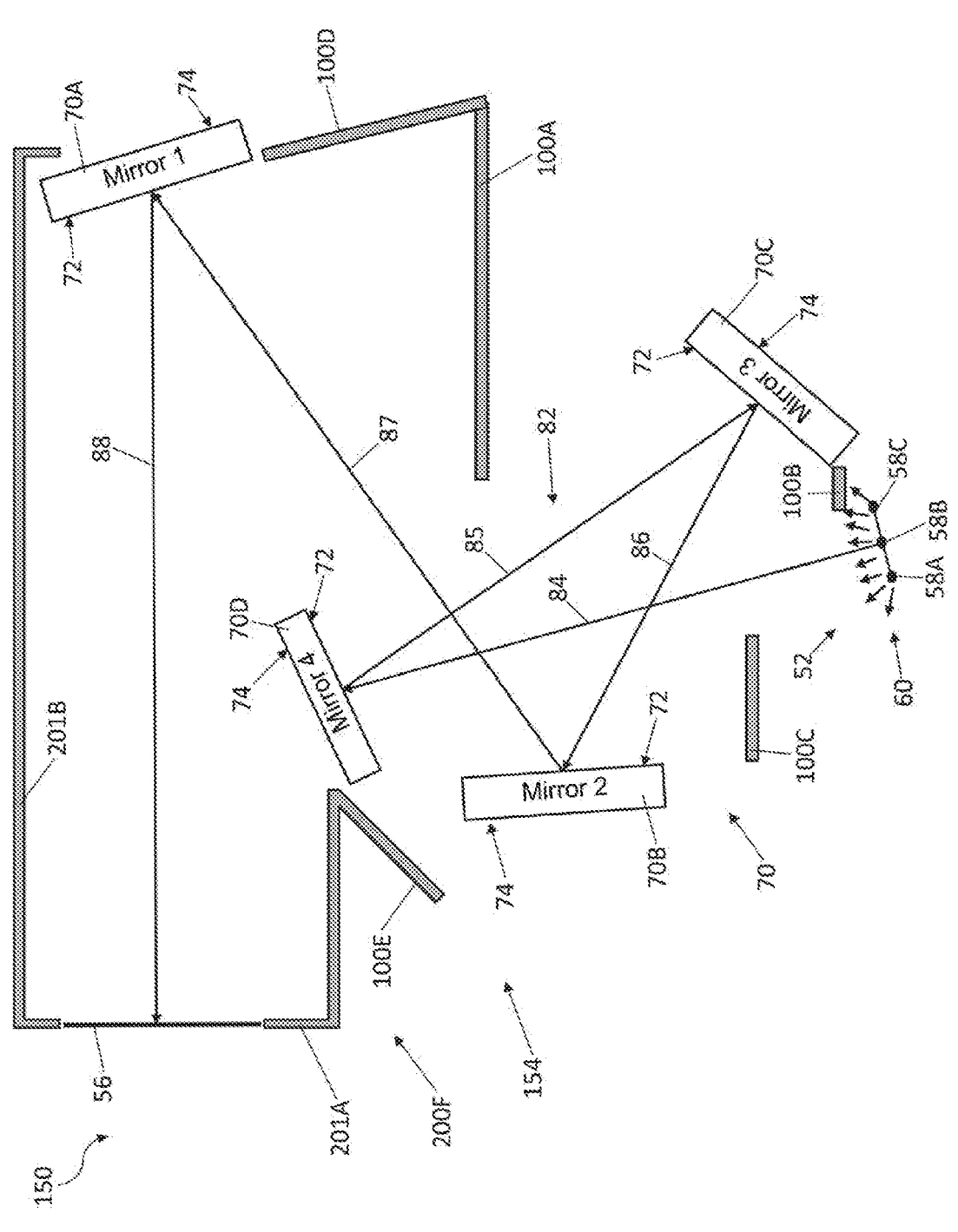
FIG. 10 shows a schematic top plan view of an illuminator comprising a collimator, according to a different embodiment of the present invention.

FIG. 10 shows a different embodiment of the present illuminator, here indicated by 150.

In particular, the illuminator 150 has a same structure as the one of the illuminator 50 of FIGS. 2-9, except for the differences discussed below. Thus, common elements are indicated by the same reference numerals and the illuminator 150 will be described only with reference to the differences compared to the illuminator 50.

In detail, the illuminator 150 comprises the extended light source 52, the aperture 56 and a collimator, here denoted by 154.

The collimator 154 comprises, also in this embodiment, the mirrors 70A-70D, the first baffle 100A, the second baffle 100B, the third baffle 100C, the fourth baffle 100D, and an absorbent structure 200F including the fifth baffle 100E.

The absorbent structure 200F further comprises two encapsulation portions 201A, 201B.

The encapsulation portion 201A forms a single piece with the fifth baffle 100E.

The encapsulation portions 201A, 201B laterally delimit the aperture 56 and the final stretch of the collimator optical path 80, i.e. the fifth stretch 88 of the collimator optical axis 82.

In practice, the encapsulation portions 201A, 201B form further portions for absorbing the stray light of the illuminator 154; they thus contribute to further decreasing the signature of the collimator 154.

Figure 11:
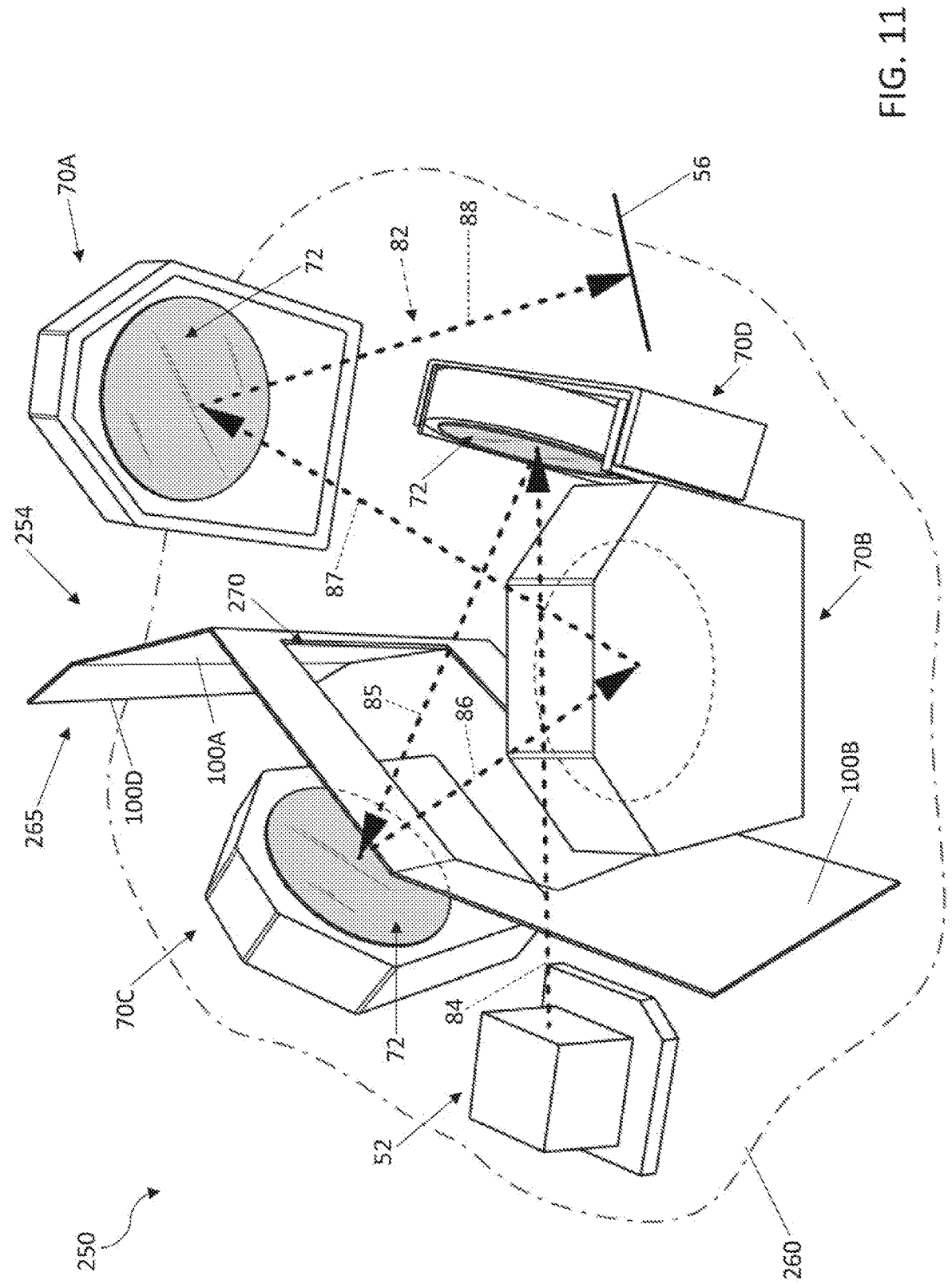
FIG. 11 shows a perspective view of an illuminator comprising a collimator according to a further embodiment of the present invention.

FIG. 11 shows a perspective view of a further embodiment of the present illuminator, here indicated by 250.

In particular, the illuminator 250 has a same structure as the one of the illuminator 50 of FIGS. 2-9, except for the differences discussed below. Thus, common elements are indicated by the same reference numerals and the illuminator 250 will be described only with reference to the differences compared to the illuminator 50.

In detail, the illuminator 250 is formed by the extended light source 52, the aperture 56 (shown only schematically in FIG. 12) and by a collimator, here indicated by 254 and comprising the mirrors 70A-70D.

The mirrors 70A-70D and the extended light source 52 are mounted on a working optical plane 260 such that the collimator optical axis 82 lies in a single plane parallel to the working optical plane 260.

The collimator 254 also comprises here the first baffle 100A, the second baffle 100B, and the fourth baffle 100D.

The third baffle and the fifth baffle are shown in transparency in FIG. 11, for clarity's sake.

In this embodiment, the first baffle 100A, the second baffle 100B and the fourth baffle 100D are mutually contiguous to portions forming a single absorbent body 265 having a through cavity 270.

The first, the second, and the third stretch 84, 85, and 86 of the collimator optical axis 82 pass through the through cavity 270.

The illuminators 50, 150, 250 may be used to obtain a system 300 for testing the stray light of a unit under test 305, as shown in FIG. 12.

For simplicity's sake, in the following, reference will be made only to the illuminator 50. However, the same considerations also apply to the illuminators 150 and 250.

For example, the illuminator 50 may be used to obtain an Optical Ground Support Equipment (OGSE) capable of testing, calibrating, and/or verifying the optical characteristics, in particular the optical characteristics of stray light, of the unit under test 305, during specific Assembly Integration and Test (AIT) activities or Assembly and Integration Test (AIT) activities.

The unit under test 305 can be any electro-optical device, e.g. of the objective, telescope or afocal type, and is formed by an optical architecture 305A and an optical detector 305B.

The optical architecture 305A is configured to receive the output beam 64 output from the aperture 56 of the illuminator 50, and generate a device light beam 310, focused on the optical detector 305B.

In use, the optical architecture 305A may generate stray light 311, starting from the propagation of the output beam 64 received by the illuminator 50.

Consequently, the device light beam 310 comprises both a primary portion 312, forming the desired optical signal in output from the optical architecture 305A, and a device stray portion 313, generated by the stray light 311.

The optical detector 305B receives the device light beam 310 and generates a corresponding detection signal, e.g., an electrical signal.

The fact that the illuminator 50 outputs only the desired optical stimulus for the unit under test 305, i.e. in this case a collimated beam without an uncollimated stray component, makes it possible to distinguish, in the detection signal, the stray portion 313 of the device light beam 310 generated by the unit under test 305 itself.

Consequently, thanks to the illuminator 50, the optical properties of the stray light of the unit under test 305 can be effectively tested.

Finally, it is evident that modifications and variations can be made to the collimator and to the illuminator described and shown herein, without departing from the scope of the present invention.

The extended light source 52 may be generically any non-point light source, for example a distributed light source.

For example, one or more of the mirrors 70A-70D may be aspherical. For example, as described in U.S. Pat. No. 5,142,417 A, an eccentricity can be introduced to one or more of the spherical mirrors 70A-70D, in particular to the primary mirror 70A and the mirror 70B, in order to reduce the aberrations of the respective collimator.

For example, the present illuminator can be configured to shield only a portion of the secondary light beam propagating directly towards the aperture.

The invention claimed is:

1. An illumination optical device, comprising:
a collimator;
a light source; and
an aperture;
wherein the collimator comprises a primary mirror, a secondary mirror, a tertiary mirror, and a quaternary mirror mutually tilted so as to form a collimator optical path extending between the light source and the aperture and formed, in succession, by the light source, the quaternary mirror, the tertiary mirror, the secondary mirror, the primary mirror, and the aperture;
wherein the light source is configured to emit light rays along respective directions, said light rays forming:

a main light beam including light rays propagating along directions intercepting the quaternary mirror so as to follow the collimator optical path; and
a secondary light beam including light rays propagating along directions not intercepting the quaternary mirror;
a shielding structure configured to prevent illumination of the aperture by the secondary light beam;
wherein the primary mirror and the quaternary mirror are mutually tilted of an angle comprised between 89° and 91°.

2. The illumination optical device according to claim 1, wherein the shielding structure forms, in the absence of the primary mirror, the secondary mirror, the tertiary mirror, and the quaternary mirror, a first shadow region and a second shadow region with respect to the secondary light beam, the primary mirror being arranged in the first shadow region, the tertiary mirror being arranged in the second shadow region.

3. The illumination optical device according to claim 1, wherein the shielding structure forms, in the absence of the primary mirror, the secondary mirror, the tertiary mirror and the quaternary mirror, a third shadow region with respect to the secondary light beam and comprises a first optically absorbent portion, the secondary mirror being partially arranged in the fourth shadow region, so as to be illuminated by a part of the light rays of the secondary light beam; and wherein the secondary mirror, the quaternary mirror and the first optically absorbent portion are configured to form, in succession, a trap optical path, so that said part of the light rays of the secondary light beam follows the trap optical path and is absorbed by the first optically absorbent portion.

4. The illumination optical device according to claim 1, wherein the shielding structure forms, in the absence of the primary mirror, the secondary mirror, the tertiary mirror and the quaternary mirror, a fourth shadow region with respect to light rays of the secondary light beam and with respect to light rays of the main light beam reflected by the tertiary mirror along directions intercepting the aperture, the aperture being arranged in the fourth shadow region.

5. The illumination optical device according to claim 1, wherein the secondary mirror and the quaternary mirror are mutually tilted of an angle comprised between 89° and 91°.

6. The illumination optical device according to claim 1, wherein the shielding structure forms a single optically absorbent body.

7. The device according to claim 1, wherein the shielding structure comprises a second optically absorbent portion defining the aperture.

8. The illumination optical device according to claim 1, wherein the primary mirror, the secondary mirror, the tertiary mirror and the quaternary mirror are spherical mirrors.

9. The illumination optical device according to claim 1, wherein the collimator optical path has an optical axis formed, in succession, by a first stretch extending between the light source and the quaternary mirror, a second stretch extending between the quaternary mirror and the tertiary mirror, a third stretch extending between the tertiary mirror and the secondary mirror, a fourth stretch extending between the secondary mirror and the primary mirror, and a fifth stretch extending between the primary mirror and the aperture, wherein the first, the second, the third, the fourth and the fifth stretches are coplanar.

\* \* \* \* \*